United States Patent
Velthuis

(10) Patent No.: US 11,333,276 B2
(45) Date of Patent: May 17, 2022

(54) CLAMP ELEMENT

(71) Applicant: Bayerische Motoren Werke Aktiengesellschaft, Munich (DE)

(72) Inventor: Jan Velthuis, Landsberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 232 days.

(21) Appl. No.: 16/690,402

(22) Filed: Nov. 21, 2019

(65) Prior Publication Data

US 2020/0088331 A1 Mar. 19, 2020

Related U.S. Application Data

(63) Continuation of application No. PCT/EP2018/069385, filed on Jul. 17, 2018.

(30) Foreign Application Priority Data

Aug. 9, 2017 (DE) ...................... 10 2017 213 879.3

(51) Int. Cl.
   *F16L 23/08* (2006.01)
   *F16L 33/04* (2006.01)

(52) U.S. Cl.
   CPC ............... *F16L 23/08* (2013.01); *F16L 33/04* (2013.01)

(58) Field of Classification Search
   CPC ............ F16L 23/04; F16L 23/08; F16L 25/04
   USPC ...................... 285/410, 407, 365, 366, 420
   See application file for complete search history.

(56) References Cited

U.S. PATENT DOCUMENTS

| | | | |
|---|---|---|---|
| 252,969 A | 1/1882 | Porter | |
| 2,809,584 A * | 10/1957 | Smith | ..................... F42B 15/36 102/378 |
| 4,750,662 A | 6/1988 | Kagimoto | |
| 5,010,626 A | 4/1991 | Dominguez | |
| 7,001,107 B2 | 2/2006 | Matsuoka | |
| 8,671,525 B2 | 3/2014 | Prevot et al. | |
| 2004/0216284 A1 | 11/2004 | Belisle et al. | |
| 2016/0186902 A1 * | 6/2016 | Lee | ......................... F16L 21/06 285/420 |

FOREIGN PATENT DOCUMENTS

| | | |
|---|---|---|
| CA | 3 043 150 A1 | 6/2018 |
| CN | 2486815 Y | 4/2002 |
| CN | 1890500 A | 1/2007 |
| CN | 202788012 U | 3/2013 |

(Continued)

OTHER PUBLICATIONS

International Search Report (PCT/ISA/210) issued in PCT Application No. PCT/EP2018/069385 dated Sep. 11, 2018 with English translation (six (6) pages).

(Continued)

*Primary Examiner* — Aaron M Dunwoody
(74) *Attorney, Agent, or Firm* — Crowell & Moring LLP

(57) ABSTRACT

A clamp element, in particular a band clamp, has a first end portion and a second end portion which are arranged at a distance with respect to one another. A first element engages on the first end portion and a second element engages on the second end portion. The elements are or can be brought into engagement with one another by an engagement portion, and the engagement portion is formed between the end portions.

7 Claims, 2 Drawing Sheets

(56) References Cited

FOREIGN PATENT DOCUMENTS

| CN | 204901144 U | 12/2015 |
|---|---|---|
| DE | 1 074 930 A | 2/1960 |
| DE | 10 2010 019 864 A1 | 11/2010 |
| DE | 10 2016 123 388 A1 | 6/2018 |
| EP | 0 367 169 A1 | 5/1990 |
| FR | 2 863 335 A1 | 6/2005 |
| GB | 693566 A | 7/1953 |
| GB | 2470276 A | 11/2010 |
| WO | WO 2005/057071 A1 | 6/2005 |

OTHER PUBLICATIONS

German-language Written Opinion (PCT/ISA/237) issued in PCT Application No. PCT/EP2018/069385 dated Sep. 11, 2018 (five (5) pages).

German-language Search Report issued in counterpart German Application No. 10 2017 213 879.3 dated Jul. 3, 2018 with partial English translation (11 pages).

English Translation of Chinese-language Office Action issued in Chinese Application No. 201880038316.6 dated Sep. 28, 2020 (eight (8) pages).

\* cited by examiner

Fig. 3A
Fig. 3B
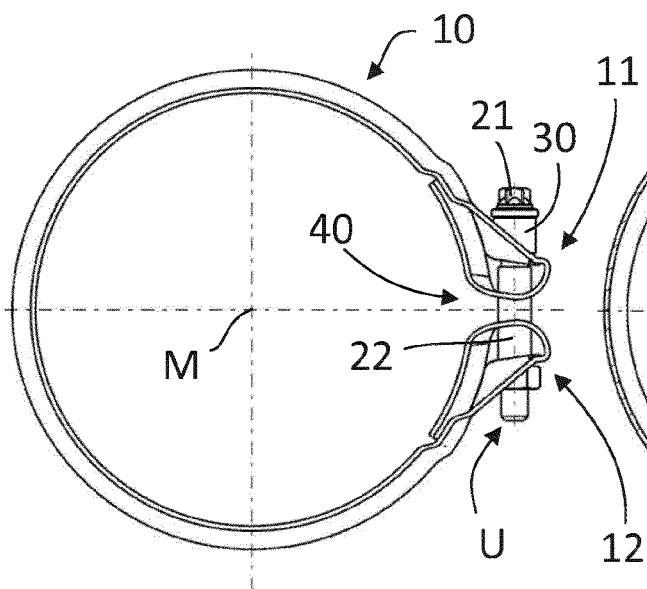
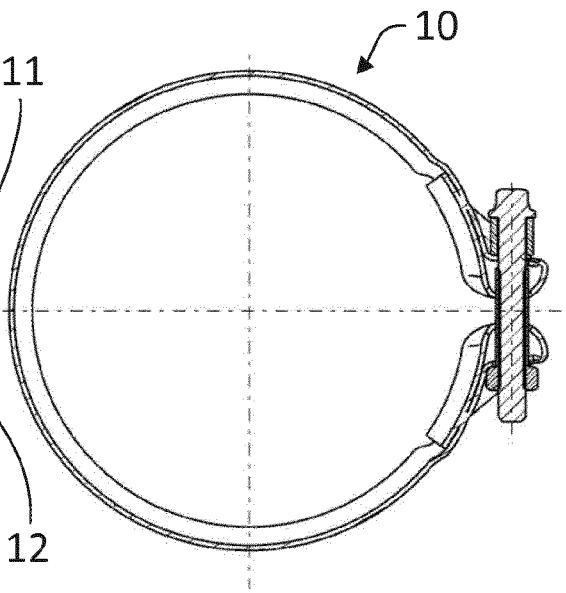
Fig. 4
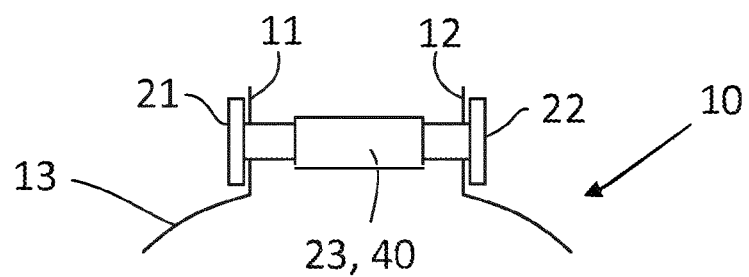

CLAMP ELEMENT

CROSS REFERENCE TO RELATED APPLICATIONS

This application is a continuation of PCT International Application No. PCT/EP2018/069385, filed Jul. 17, 2018, which claims priority under 35 U.S.C. § 119 from German Patent Application No. 10 2017 213 879.3, filed Aug. 9, 2017, the entire disclosures of which are herein expressly incorporated by reference.

BACKGROUND AND SUMMARY OF THE INVENTION

The present invention relates to a clamp element, in particular to a band clamp, to a pipe system and to a method for producing a pipe system.

Clamp elements, such as band clamps or hose clamps, are known, in principle, from the prior art. As a rule, they comprise an annular metal body, the inside diameter of which is able to be reduced (or also enlarged) by rotating suitable adjusting means, such as, for example an adjusting screw. As a result, for example, a subjacent hose can be pressed onto a connecting piece or, depending on the design of the clamp element, two tubes can be connected together etc. In automotive manufacturing, such connecting elements are used, for example, when constructing exhaust systems. The problem of very restricted space conditions arises, in this case, in automotive applications and in particular also when constructing exhaust systems. It is particularly problematic, in this connection, when the clamp elements, in order to make quick assembly possible, are as a rule supplied pre-assembled. This means that the spread of the annular basic body of the clamp element or of the inside diameter is set correspondingly large so that it is possible to slide it onto the tubes and hoses without adjusting the clamp element beforehand. The length of the adjusting means, such as, for example, the aforenamed adjusting screw, is realized accordingly. This results in the adjusting means protruding in the mounted stated and taking up installation space which, as a rule, is not available or the mounted clamp elements preventing further components being arranged and assembled in a simple manner.

It is, consequently, an object of the present invention to provide a clamp element, a pipe system and a method for producing a pipe system which eliminate the aforenamed disadvantages and, at the same time, can be realized in a simple and cost-efficient manner.

According to the invention, a clamp element, in particular a band clamp or a hose clamp, comprises a first end portion and a second end portion which are arranged at a distance, in particular at a modifiable distance, with respect to one another. A first element cooperates with or is attached to or is arranged on the first end portion and a second element cooperates with or is attached to or is arranged on the second end portion. The elements engage one another or are movable into engagement with one another by at least one engagement portion. The at least one engagement portion is formed (configured) between the end portions or at least between the end portions. In an expedient manner, the clamp element comprises a, for instance, circular or annular basic body, for example produced from a metal material or plastics material, the basic body preferably ending in the two aforenamed end portions. As a result of the interaction between the elements, which cooperate with the end portions, the distance between the end portions can be modified, by way of which ultimately the diameter of the basic body is able to be adjusted. The special feature is now that the elements interact or engage in the region between the end portions, which means that the elements, with the band clamp in the mounted state, depending on the embodiment, do not protrude or only protrude slightly or do not project beyond the respective end portions. In other words, the adjustment path, as it were, is displaced into the "distance". The adjustment path is therefore formed advantageously, in particular for at least one of the elements, within the end portions, which means that, for example, the first element can be arranged in the second element and can be displaced in the same for adjustment of the basic body without it protruding or projecting from the second element.

According to a preferred embodiment, the first element is a pin element and the second element is a sleeve element which extends in the direction of the first end portion or into the distance. In an expedient manner, the sleeve element is supported on the outside of the second end portion, whilst it extends in the direction of the first end portion. This makes it possible for the pin element cooperating with the first end portion to be realized in a clearly shorter manner than is disclosed in the prior art. The sleeve element quasi "accommodates" the pin element.

In a preferred manner, the pin element is a screw and the sleeve element is a threaded sleeve which matches thereto.

According to an alternative embodiment, an intermediate element, with which the first and the second element interact, is provided between the end portions.

In a preferred manner, the intermediate element is a cylindrical threaded sleeve, into which the first and the second elements, which in a preferred manner are realized as screws, are screwed. In the case of said embodiment, the intermediate element forms as it were the engagement portion, by which the two elements engage one another or are movable into engagement with one another.

According to an embodiment, the intermediate element comprises circumferentially a function surface for the arrangement of a tool, as a result of which rotation is able to be prevented during assembly.

Along with screw connections, plug-in connections or other positive locking and/or non-positive locking connections can also be provided as an alternative to this to realize the engagement portion.

According to an embodiment, the engagement portion extends beyond at least one of the end portions. This means, for example, that a sleeve element, in order to provide an even longer adjustment path for the pin element, is able to extend not only into the distance but also away from the same.

In an expedient manner, the end portions comprise arrangement surfaces on which the elements are able to be supported.

According to an embodiment, the elements are movably arranged, in particular so as to be rotatable about an axis which extends parallel to a center axis of the band clamp. This can achieve, where applicable, an even easier adjustment or a better introduction of force.

According to an embodiment, a spacer, for example in the form of a sleeve, is arranged between the first element, in particular the pin element (or also the second element), and the respective arrangement portion.

According to a preferred embodiment, the clamp element is realized as a V-band clamp. To this end, a corresponding inner contour which is certainly known to one of skill in the art, is provided in particular on the basic body so that there is no need for further explanation at this point.

According to an embodiment, at least one of the elements is fastened or arranged releasably on the respective end portion. As a result, flexibility is able to be increased even more in production.

The invention further relates to a pipe system, in particular to an exhaust system of a motor vehicle, including at least one clamp element according to the invention.

In addition, the invention relates to a method for producing a pipe system, wherein two pipe portions are connected together by use of a clamp element according to the invention. The pipe portions can be, for example, plastic and/or metal pipes.

The advantages and features mentioned in connection with the clamp element apply analogously and correspondingly as well as in reverse and among one another to the pipe system according to the invention and to the method according to the invention.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3A and FIG. 3B show the clamp element from FIG. 2 in the screwed-together state, shown in section in FIG. 3B and not in section in FIG. 3A.

FIG. 4 shows a further schematic part view of an embodiment of a clamp element.

DETAILED DESCRIPTION OF THE DRAWINGS

Figure 1:
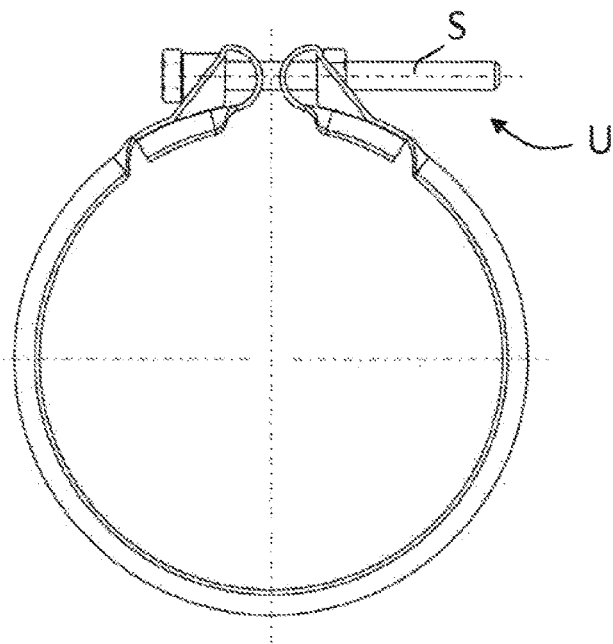
FIG. 1 shows a standard clamp element in the screwed-together state.

FIG. 1 shows a standard clamp element, as disclosed in the prior art, in the screwed-together state. A protrusion U of a screw S can easily be seen, which leads to problems in the installed state or in the screwed-together state, as the protrusion U, among other things, harbors a risk of injury and, above all, takes up installation space unnecessarily. The protrusion U is necessary as an adjustment path or an adjustment distance of the clamp element is realized by means of the length of the screw S. The clamp is thus pre-mounted as a rule in the delivery state, that is to say prior to assembly, such that there is practically not any protrusion U present, as a result of which the clamp is able to be mounted quickly and uncomplicatedly. Pre-assembly is necessary as otherwise the fast cycle times in large-scale production cannot be realized.

Figure 2:
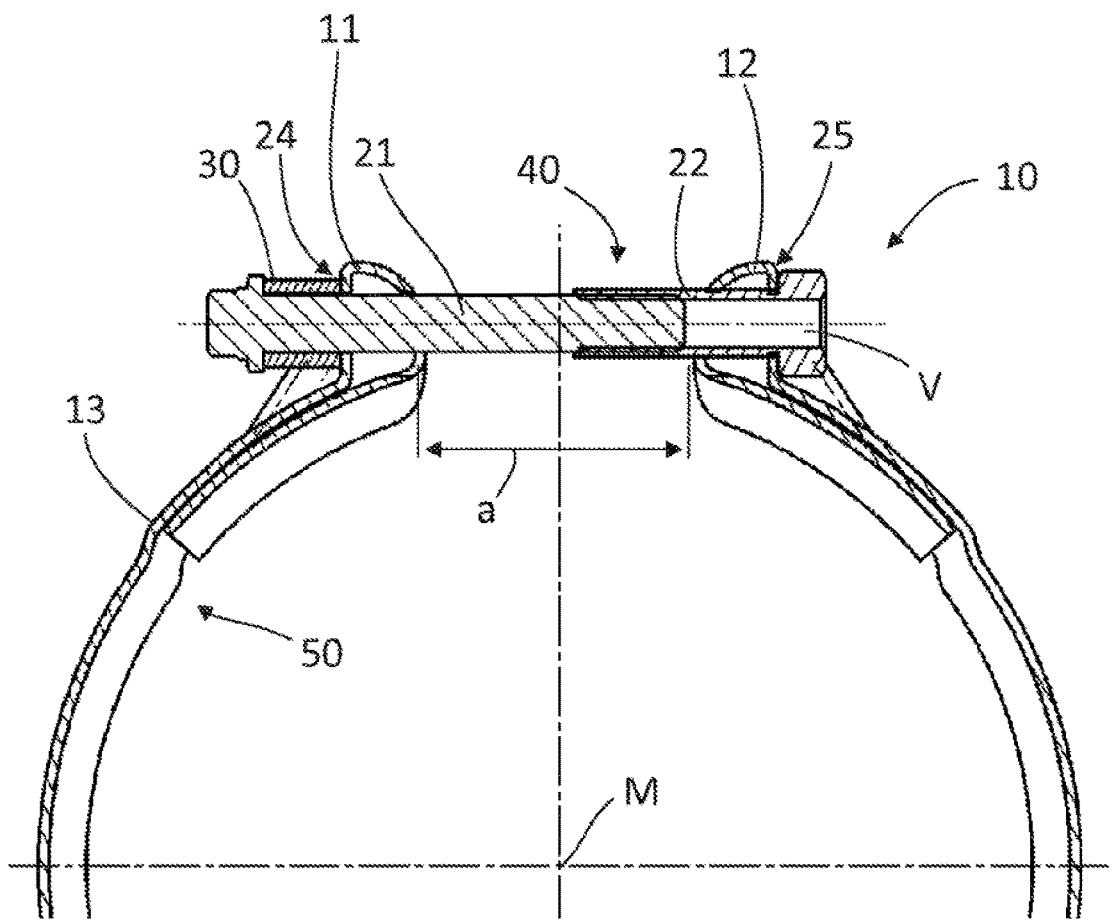
FIG. 2 shows a partial sectional representation of an embodiment of a clamp element according to the invention.

FIG. 2 shows a clamp element 10, including a basic body 13 which ends in a first end portion 11 and in a second end portion 12. First and second arrangement surfaces 24 or 25, on which are supported a first element 21 or a second element 22, are realized on each end portion. Another spacer 30 in the form of a sleeve is arranged additionally on the first element 21. In the embodiment shown here, the first element 21 is realized as a pin element, in particular as a screw, and the second element 22 is realized as a sleeve element, in particular as a threaded sleeve. It is easy to see that as a result of this configuration, engagement of the two elements 21 and 22 is made possible in the region of a distance "a" which is realized between the first end portion 11 and the second end portion 12. An engagement portion 40 is therefore realized inside the two end portions 11 and 12 and consequently in the region of the distance a. As a result, among other things, an adjustment path V for the first element 21 is formed in the second element 22. The first element 21 can therefore be screwed further into the second element 22 without it exiting, protruding or projecting from the second element 22. In this respect, the adjustment path V is also to be seen, in particular, as an inner adjustment path which makes it possible for the installation space requirement of such a clamp element 10 to be minimal. A center axis of the clamp element 10 is also outlined, in addition, by way of the reference symbol M. The reference symbol 50 refers to an inner contour which is realized on the basic body 13, as in the case of the embodiment shown here this is, in particular, a V-band clamp which is used, for example, when constructing or assembling exhaust systems of motor vehicles.

FIG. 3A and FIG. 3B show the clamp element 10 known from FIG. 2 in the screwed-together state, shown in section in FIG. 3B and not in section in FIG. 3A. It is clear, in particular also in comparison with FIG. 1, that a protrusion U is minimal or, depending on how far screwed-together they are, where applicable, is not present at all. In this case, nevertheless, as can be seen in FIG. 2, a maximum adjustment distance or a very large opening diameter is achieved in the pre-mounted state as in the case of conventional clamp elements. Reference is made to FIG. 2 with regard to the further features provided with reference symbols.

FIG. 4 shows a sketched representation of a clamp element 10, including a basic body 13 which ends in a first end portion 11 and a second end portion 12. An engagement portion 40 is realized here by means of an intermediate element 23, in which the first element 21 and the second element 22 engage. The first element 21 and the second element 22 are realized, for example, as screws, whilst the intermediate element 23 is a threaded sleeve.

LIST OF REFERENCES

10 Clamp element, band clamp, hose clamp
11 First end portion
12 Second end portion
13 Basic body
21 First element, pin element
22 Second element, sleeve element, threaded sleeve
23 Intermediate element, threaded sleeve
24 First arrangement surface
25 Second arrangement surface
30 Spacer, sleeve
40 Engagement portion
50 Contour V-band clamp
a Distance
M Center axis
V (Inner) adjustment path
U Protrusion The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A clamp element, comprising:
a first end portion and a second end portion which are arranged at a distance to one another;
a first element that cooperates with the first end portion; and a second element that cooperates with the second end portion, wherein the first and second elements engage one another or are movable into engagement with one another via an engagement portion, the engagement portion is formed between the end portions, the engagement portion is an intermediate element, and the first element is a first screw, the second element is a second screw, and the intermediate element is a threaded sleeve.

2. The clamp element according to claim 1, wherein the clamp element is a band clamp.

3. The clamp element according to claim 1, wherein the clamp element is a V-band clamp.

4. The clamp element according to claim 1, wherein at least one of the first and second elements is arranged releasably on the respective end portion.

5. A pipe system, comprising:

at least one pipe; and at least one clamp element according to claim 1 for use with the pipe.

6. The pipe system according to claim 5, wherein the pipe system is an exhaust system.

7. A method for producing a pipe system, comprising:

providing two pipe portions that are to be connected; and connecting the two pipe portions via a clamp element, the clamp element comprising:

a first end portion and a second end portion which are arranged at a distance to one another;

a first element that cooperates with the first end portion; and a second element that cooperates with the second end portion, wherein the first and second elements engage one another or are movable into engagement with one another via an engagement portion, the engagement portion is formed between the end portions, the engagement portion is an intermediate element, and the first element is a first screw, the second element is a second screw, and the intermediate element is a threaded sleeve.

\* \* \* \* \*